[19] United States Patent
Willich et al.

[11] 3,774,895
[45] Nov. 27, 1973

[54] HYDRAULIC IMPACT ABSORBER
[75] Inventors: Jean Herbert Willich; Johannes J. DeBaan; Erich Hahn, all of Ennepetal, Germany
[73] Assignee: Firma August Bilstein, Ennepetal-Altenvoerde, Germany
[22] Filed: June 20, 1972
[21] Appl. No.: 264,503

[30] Foreign Application Priority Data
July 14, 1971 Germany.................. P 21 35 000.5

[52] U.S. Cl.............................. 267/136, 267/64 R
[51] Int. Cl................................................ F15f 7/00
[58] Field of Search.................. 267/35, 64 R, 122, 267/136

[56] References Cited
UNITED STATES PATENTS
1,234,311 7/1917 Duncan............................ 267/64 R
1,350,414 8/1920 Langdon.......................... 267/64 R Primary Examiner—James B. Marbert
Assistant Examiner—Lawrence J. Oresky
Attorney—Albert H. Pendleton et al.

[57] ABSTRACT

A hydraulic impact absorber designed particularly for the front and rear ends of motor vehicles which can absorb impacts by radial expansion of a resilient liquid-filled bag upon compression of a pair of telescopic tubes secured to and encircled by the bag. The bag has restorative properties permitting repeated use of the impact absorber up to a predetermined impact velocity. Special provision is made for controlled throttling of the damping liquid in its passage within the impact absorber in the event of compression under impact.

26 Claims, 7 Drawing Figures

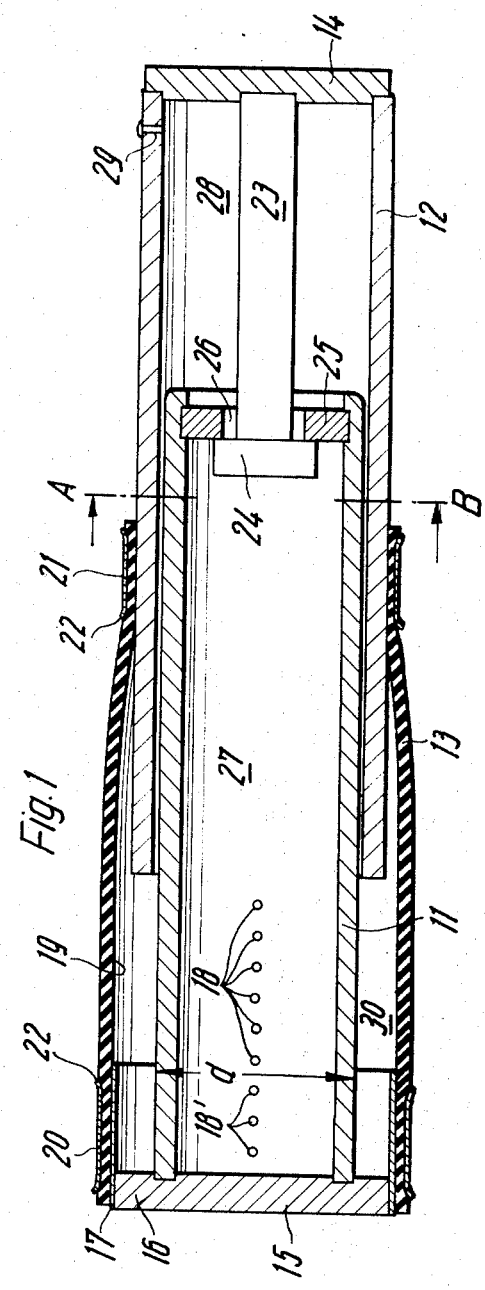

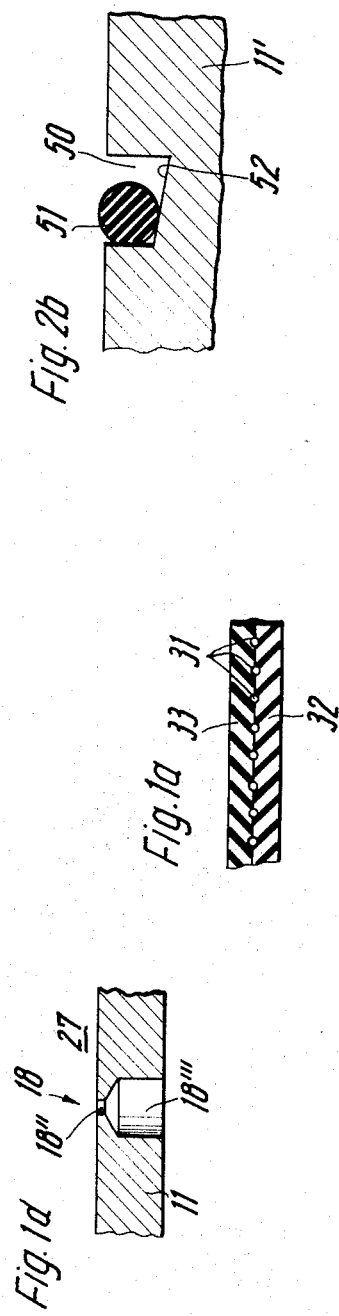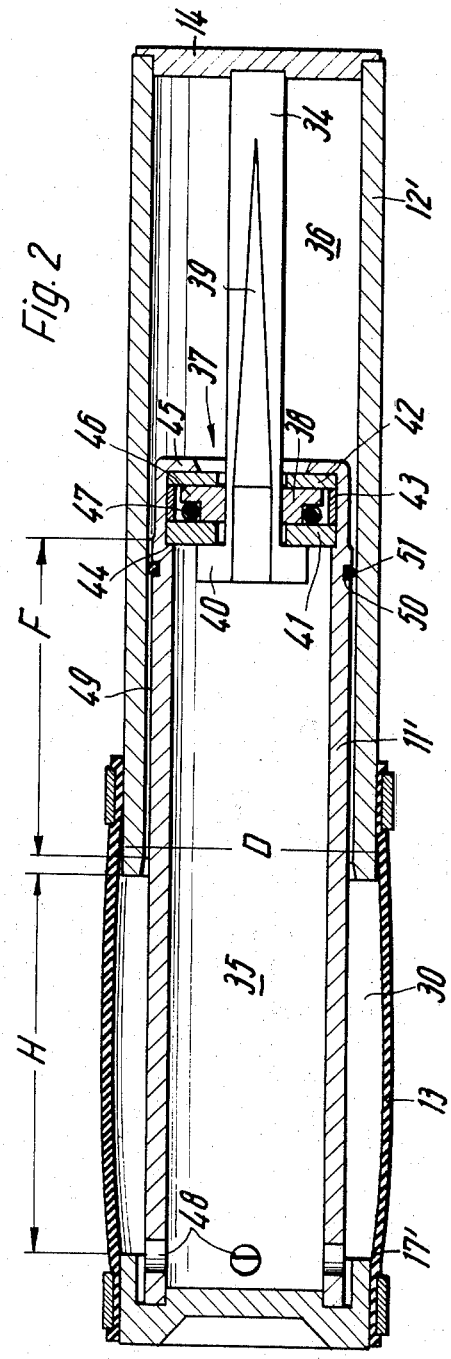

HYDRAULIC IMPACT ABSORBER

FIELD OF THE INVENTION

This invention relates to a hydraulic impact absorber comprising two telescopically movable tubes containing damping liquid, and a resilient bag secured to and encircling the tubes, the bag being arranged to receive damping liquid expelled from the tubes through throttling port means upon compression of the tubes and at the end of a compression stroke being able to restore itself resiliently.

Impact absorbers serve to absorb and dissipate the energy from single or limited numbers of successive shocks, for example which are exerted on vehicles in the event of impact at low speeds. Absorption of the shock must take place so that up to a predetermined velocity damage to the chassis of the vehicle does not occur and also so that the impact absorber can be restored to its original condition. In this way, it is possible to avoid repairs for example to headlights or the exhaust system in the event of direct or inclined frontal or rear impact at low speeds.

DESCRIPTION OF THE PRIOR ART

A shock absorbing device is already known in which two telescopically arranged tubes are externally surrounded by a resilient bag and are provided with a number of holes through which damping liquid contained in the tubes is forced upon relative compression of the tubes. The damping liquid which is expelled is taken up by the outward ballooning of the bag. In its rest condition the bag is in the form of a ring having a substantially square cross-section and has a peripheral channel in the radially outwardly facing surface. The side walls of the ring neighbouring this channel are respectively secured to an impact or support plate which additionally respectively constitute the bases of the telescopic tubes. This known shock absorbing device is limited to use with railway rolling-stock. Because of the shaping of the resilient bag, this known device can only be utlized in units of comparatively short structural length and operating with comparatively short lengths of stroke. For greater lengths of stroke one either has to incur considerably greater material costs for the bag or renounce the necessary constant restoring force for returning the shock absorbing device to its initial condition. Because of the short structural length of this known shock absorbing device, the tubes can only overlap one another to a small extent in the rest condition. The lateral stability of the shock absorbing device is therefore small.

SUMMARY OF THE INVENTION

It is an object of the present invention to provide an impact absorber of the generic type first mentioned above which is particularly suited for motor vehicles. Wth motor vehicles it is necessary to dissipate the energy of impact as uniformly as possible so that no undesirable delays occur during the impact event which would lead to high concentrations of force. Thus, the component parts of the motor vehicle and its occupants are protected as far as possible if the impact absorber acts softly. In addition to this it is important that the impact absorber should have sufficient lateral stability that the bumper or fender of the motor vehicle can be carried by it, and that it also operates satisfactorily in the event of oblique or one-sided impacts. Furthermore, it is preferable that no rattling noises occur at the front end of the vehicle under conditions of maximum vertical acceleration.

This is achieved in accordance with the invention by a hydraulic impact absorber comprising two telescopically movable tubes containing damping liquid, a resilient bag encircling and secured to said tubes, said bag being arranged to receive damping liquid expelled from the tubes through the throttling port means on compression of the tubes and at the end of a compression stroke being able to restore itself resiliently, wherein the length of the sliding and mutually guiding overlapping surfaces of the two tubes in the rest position of the impact absorber is at least as great as the diameter of the said surfaces, wherein said diameter is less than the maximum stroke length, and wherein the resilient bag is formed as a tubular rolling bag with reinforcing means.

It is important for the invention that the two tubes overlap one another sufficiently in the rest position of the impact absorber. For this purpose the length of the sliding and mutually guiding overlapping surfaces is equal to or greater than the diameter of the said surfaces. The sliding surfaces themselves are suffiiently large that the two tubes cannot bend and the resistance of the impact absorber to cracking is increased. The maximum stroke length preferably does not exceed the diameter of the sliding surfaces so that the necessary volume of damping liquid for the comparatively long stroke of the impact absorber can be kept small. Of particular importance in the impact absorber is the formation of the resilient bag as a tubular rolling bag with reinforcing means. This rolling bag is able to take up larger volumes of damping liquid expelled upon impact from the tubes through the throttling port means, and thus facilitates the construction of the impact absorber with a long stroke. Because of its elasticity the rolling bag springs back after termination of the compression stroke and thus forces the damping liquid back into the tubes so that the impact absorber is restored to its initial state. the reinforcing means in the rolling bag prevents the bag from changing its shape after repeated use of the impact absorber. The reinforcing means may comprise a fabric insert or alternatively a plastics material insert. If a resilient synthetic plastics material is used for the bag the material is not capable of flowing, so that a permanent constant restorative force on the impact absorber is ensured. For impact absorbers obviously designed for small numbers of shocks or for small stresses the fabric insert may possibly be omitted.

The maximum stroke length should preferably not exceed the length of the sliding surfaces of the impact absorber.

According to a preferred feature of the impact absorber, the damping liquid is held permanently under a pressure greater than the atmospheric pressure by the resilient bag. In this way one not only achieves the expansion force necessary for full restoration of the impact absorber, but one also ensures that the shock is absorbed satisfactorily by the volume of damping liquid enclosed under excess pressure. Squeaks and rattles of the impact absorber are excluded since the damping liquid located in all clearances acts dampingly on vibrations or short-term relative movements of the components of the impact absorber. Moreover, the surfaces of the two tubes which slide over one another upon telescopic movement are perfectly lubricated by the damping liquid, so that no wear and no weather-dependent fluctuations of the sliding friction occur and the restoring force of the bag can therefore be kept small. The time required for restoring the impact absorber to its initial position is small, so that a succession of shocks occurring in an accident will be damped in the same way. Preferably, the resilient bag has a resilient internal layer on the inside of its reinforcing means, and on the outside of its reinforcing means has a dirt-resistant, and preferably ozone-resistant, resilient external layer. The reinforcing means is therefore preferably embedded between two resilient layers which are respectively adapted to their particular requirements.

The external diameter of the resilient bag may be limited by the reinforcing means with the tubes telescoped together. This means that the resilient bag which bulges radially outwardly upon a compression stroke extends as little as possible into the region of neighbouring parts of the vehicle, and because of this it is not hindered or indeed damaged during its expansion.

The resilient bag may have its ends rigidly secured to the cylindrical surfaces of the tubes and/or to correspondingly shaped flange portions coupled to one or both tubes. The fastening is therefore very simple and above all provides optimum sealing against leadkage of liquid since the ends of the tubular bag are remote from the pressure chamber so that no liquid can creep into the reinforcing insert. The resilient bag is substantially unchanged in its tubular form, so that no areas of the tubular bag are subjected to specifically higher material stresses than others. By securing the resilient bag to flange portions the structural length of the impact absorber can be kept short so that the outer tube is adapted to be displaced completely or almost entirely over the inner tube.

The resilient bag may be formed as an end stop limiting the outward relative movement of the tubes, so that without any additional structural means its rest position is always defined.

According to one form of the invention, the throttling port means comprises a plurality of ports provided through one of said tubes, the throttling ports being arranged to be sealed off sequentially by the other tube upon inward telescoping movement of the tubes, and at the outer end of said one tube there is provided a flange ring encircling and radially spaced from said one tube and overlapping at least certain of the throttling ports adjacent to the tube outer end, and with the flange ring having the resilient bag mounted thereon. Since upon a compression stroke the streams of damping liquid forced through the throttling ports of the inner tube into the resilient bag travel at high velocity and consequently impinge with high energy against the internal wall of the resilient bag, this could with frequent use of the impact absorber cause damage to the bag and finally cause it to be so badly damaged that it would become unserviceable. Since with increasing length of stroke ever more throttling ports are blanked off, and energy of the liquid streams passing through the throttling ports which are the last to be blanked off becomes so high that the resilient bag should deisrably be protected, particularly in this region. The flange ring referred to above and on which the resilient bag is mounted can perform this additional function. The flange ring must be radially spaced from the inner tube at a sufficient distance to enable the end of the outer tube to pass radially inwardly of the flange ring.

In order to reduce the energy of the liquid streams emerging from the throttling ports, the throttling ports may be shaped to be of increasing cross-section radially outwardly of the tube axis.

According to an alternative form of the invention, the throttling port means is formed by a control rod carried by the outer tube, determining the flow cross-section, and displaceable into a bore through a control plate dividing the internal chambers of the tubes from one another, the internal chamber of the inner tube being connected to the chamber enclosed by the resilient bag by overflow port means. The control rod makes possible a more accurate control of the damping action. Moreover, the damping is achieved by the transfer of damping liquid from the internal chamber of the outer tube to the internal chamber of the inner tube, and thus at a position where there are no adjacent components which are sensitive to a stream of damping liquid.

Preferably, the control rod is basically cylindrical with a flat surface area decreasing in flow cross-section with increasing compression stroke. The flat surface area can readily be produced with sufficient accuracy and makes possible a gradual transition of the control rod from one damping position to an adjacent damping position. The flat surface area may be formed so that damping is effected with substantially constant dissipation of energy in dependence on the stroke of the control rod.

The control rod may be floatingly guided within the control plate, so that centering inaccuracies occurring during the fixing of the control rod to the outer tube can be equalized. In a preferred form of the invention, the control plate comprises a guide ring which is only movable radially, and a sealing ring provided axially between a radial shoulder of the guide ring and the inner tube or a support ring secured thereto. This arrangement of floatingly guiding the control rod means that its radial movements have no effect on the sealing action. On the contrary, the control rod is only affected by forces acting axially thereon. It is preferable if the radial shoulder is positioned between the sealing ring and the inner end of the inner tube, since then forces transmitted by the control rod to the guide ring upon compression strokes reinforce the sealing action.

The control plate preferably includes two support rings held spaced apart and connected rigidly to the inner tube, the support rings holding the guide ring therebetween for radial displacement. In this way a preferred and simple form of control plate is produced which may be held in the inner end of the inner tube by pressing the tube on to the control plate and thereby reducing the external diameter of the tube in the region of the control plate.

The two tubes preferably fit inside one another with clearance therebetween and a sealing ring is provided in an annular groove in the external surface of the inner tube. The provision of the sealing ring makes it possible to maintain the damping characteristic to a high degree of accuracy so that the clearance between the sliding surfaces of the tubes cannot affect the damping characteristic. On the other hand, this clearance makes it possible to use tubes whose adjacent diameters do not need to be calibrated to an exact degree, and this also permits greater manufacturing tolerances. In consequence, the production of a cheap impact absorber, but one which nevertheless operates with an accurate damping characteristic, is made possible. The annular groove for the sealing ring preferably has a bottom surface which slopes radially inwardly towards the inner end of the inner tube, so that upon compression of the tubes the sealing of the two tubes relative to one another in the region of their sliding surfaces is increased, while upon expansion strokes the sealing ring is moved into the deepest zone of the annular groove in a sense to reduce the frictional forces.

The outer tube preferably includes a rigid stop which is arranged to engage against the inner tube with the parts of the impact absorber in their rest positions. This rigid stop makes it possible for example to lift a motor vehicle by the impact absorber or to lift a motor vehicle by a bumper or fender carried by the impact absorber, without the resilient bag being damaged by being stretched excessively. The rigid stop may comprise a cross-piece positioned within the internal chamber of the inner tube and carried by the control rod or an axial rod having no flat surface area, the cross-piece being arranged to abut against the control plate or against a stop ring secured in the inner tube, when the parts of the impact absorber are in their rest positions. The cross-piece is preferably of rectangular cross-section viewed in the direction of compression and is positioned offset through 90° relative to a correspondingly shaped aperture in the stop ring. In this way the interfitting of the outer and inner tubes is made possible after the axial rod with its cross-piece has already been secured to the outer tube. The cross-piece is fitted through the aperture in the stop ring, and then the outer tube is rotated through 90° and the bag is secured thereto.

A filler hole for the damping liquid is preferably provided in a zone of the outer tube not encircled by the resilient bag. The bases of the tubes may additionally be used for the fitting of mounting means without any damage being caused to the plug of the filler hole on fitting of the impact absorber, for example as a result of welding it to the vehicle.

The damping liquid is preferably an oil with a flat viscosity curve, so that the damping force is substantially independent of temperature.

In a preferred embodiment of the invention, the impact absorber has a maximum stroke length corresponding to a particular predetermined impact velocity, but the resilient bag on the other hand can only receive damping liquid expelled from the tubes in an amount corresponding to only a partial stroke. The maximum stroke length can be chosen for a high impact velocity, corresponding to a severe collision, in which in the case of an impact parts of the vehicle chassis are deformed by crumpling. If the impact absorber of the present invention is connected in front of these crumpling zones, the crumpling zones deform correspondingly for example to decelerations of perhaps 30g while the impact absorber connected in front of the crumpling zone is able to work with the longer delays and thus act as a force dissipator right up to the end of its stroke. The resilient bag only needs to be of a size corresponding to the volume of damping liquid expelled during such a partial stroke.

DESCRIPTION OF THE DRAWINGS

A number of embodiments of the invention will now be described by way of example and with reference to the accompanying drawings, in which:

FIG. 1 is a longitudinal sectional view through a first embodiment of impact absorber in accordance with the invention with throttling ports which are arranged in line along the line of compression serving as ports for the damping liquid;

FIG. 1a is a partial longitudinal sectional view on an enlarged scale through the resilient bag of FIG. 1;

FIG. 1b is a sectional view taken along the line A–B of FIG. 1;

FIG. 1c shows the bag filled with damping liquid after an inward compressive displacement of the outer tube;

FIG. 1d is a partial sectional view through the wall of the inner tube in the region of a throttling port, and on an enlarged scale;

FIG. 2 is a longitudinal sectional view through a second embodiment of impact absorber in accordance with the invention; and FIG. 2b is a view on an enlarged scale of an annular groove in the external surface of the inner tube in the region of overlap with the outer tube, and showing a sealing ring arranged in the annular groove.

DESCRIPTION OF THE PREFERRED EMBODIMENTS

The impact absorber shown in FIG. 1 comprises an inner tube 11, an outer tube 12, and a resilient bag 13 secured to the tubes and encircling them. The two tubes 11 and 12 are fitted into one another telescopically so as to be relatively slidably displaceable and so that the outer tube 12 can be displaced wholly over the inner tube 11. The outer tube 12 is closed at the right-hand end as viewed in FIG. 1 by an end plate 14, for example a plate welded to the tube. The inner tube 11 is closed at its left-hand end as viewed in FIG. 1 by a cap 15 having a portion 16 which projects radially outwardly beyond the inner tube 11 which is itself of external diameter $d$. The cap 16 carries a flange ring 17 at its periphery and the flange ring 17 encircles the inner tube 11 and is spaced from it. The flange ring 17 protects the internal surface 19 of the resilient bag 13 in the region of throttling ports 18' and makes it possible for the open end of the outer tube 12 to be displaced over the inner tube 11 right up to the cap 15. One end of the resilient bag 13 is carried by the flange ring 17 and the bag is clamped to it by means of a circumferential fastening ring 20. The resilient bag 13, which is formed as a rolling bag, has its other end clamped by a fastening ring 21 to the external surface of the outer tube 12. The fastening of the ends of the tubular rolling bag to the flange ring 17 and to the outer tube 12 may be effected for example by the fastening rings and bag ends being pushed on together in one press-fit operation or by the resilient bag being first fitted loosely and the fastening rings thereafter being pushed on and tightened down to the required diameter. The edges 22 of the fastening rings are turned out radially so that they do not damage the resilient bag when the latter bulges outwardly as a result of compression of the two tubes 11, 12.

A rod 23 which projects into the right-hand end of the inner tube 11 is carried by the end plate 14 of the outer tube 12 and is arranged coaxially within the outer tube. A stop 24 is fitted at the free end of the rod 23 and in the illustrated rest position of the impact absorber is in contact with an abutment ring 25 fitted within the end of the inner tube 11. The abutment ring 25, which has a central hole 26 through which the rod 23 passes, is fitted to the inner tube 11 by a pressing operation for example, so that if a tensile force is exerted on the outer or inner tube this force is transmitted through the axial rod 23, the stop 24, and the abutment ring 25. The tensile force, which particularly when towing away a motor vehicle fitted with the impact absorber could exceed the rupture strength of the resilient bag 13, is thus transmitted through suitably large dimensioned components to the motor vehicle itself. It will be appreciated from FIG. 1b that the hole 26 connecting the internal chamber 27 of the inner tube with the internal chamber 28 of the outer tube is rectangular viewed along the line of compression, and is suitably dimensioned in relation to the rectangular cross-section of the stop 24. The stop 24 is however rotated through 90° relative to the hole 26. The fitting together and the taking apart of the two tubes with their associated parts can thus only be effected if the outer tube is rotated relative to the inner tube through 90° and if then the outer tube is pulled off the inner tube or has the inner tube withdrawn therefrom so that the stop 24 passes through the hole 26.

After its assembly the impact absorber is filled with damping liquid through a filler hole 29, shown plugged in the drawing, provided in that region of the outer tube 12 which is not shrouded by the bag 13, whereby the internal chambers 27 and 28 of the tubes and the chamber 30 enclosed by the bag 13 are filled with damping liquid. The chambers communicate by way of the hole 26 and by way of throttling ports 18 and 18' formed through the inner tube 11. One such throttling port 18 is shown on an enlarged scale in FIG. 1d. The port comprises a first section 18'' opening to the internal chamber 27 of the inner tube 11, and a larger diameter section 18''' radially outwardly of the section 18''. Upon compression of the two tubes 11, 12 the damping liquid is first forced to flow through the smaller port sections 18'' and then through the larger port sections 18''' which act as diffusers so that the streams of liquid disperse. In addition to this effect the throttling ports provide an advantage from the manufacturing point of view since the throttling ports need only be calibrated accurately in respect of the smaller sections 18'' in order to ensure the desired damping characteristic of the impact absorber.

The damping liquid is held continuously under a pressure greater than atmospheric pressure by the resilient bag 13 so that the impact absorber always adopts the illustrated rest position when no external forces are acting on it. For this purpose the bag is constructed as a rolling bag with fabric inserts. FIG. 1a shows a fabric insert 31 which is bonded on the inside to a resilient inner layer 32 impermeable to damping liquid and on its outside to a dirt-resistant, particularly ozone-resistant, resilient outer layer 33. This fabric insert 31 makes possible the construction of the resilient bag as a stop means limiting the relative expansion of the two tubes 11 and 12, since the insert prevents an extension of the bag beyond the length illustrated in FIG. 1. Furthermore, the external diameter of the resilient bag can be limited by the fabric insert when the tubes 11 and 12 are compressed together, because the insert opposes radial deformation of the bag with a greater resistance than axial deformation thereof. This can be achieved if the threads of the fabric insert are arranged substantially concentrically or helically about the axis of the impact absorber or if the number of fabric threads extending substantially transversely to the impact absorber axis is greater than the number of axially extending fabric threads.

In the event of an impact the impact absorber is compressed, with the result that the damping liquid, for example oil, which is at for example a pressure of perhaps 1 kp/cm² above atmospheric pressure, is expelled from the inner chamber 28 and the chamber 27 through the throttling ports 18, 18' and into the chamber 30. Upon such compressive movement the chamber 30 is enlarged additionally by the elasticity of the rolling bag. At the same time the outer tube 12 increasingly blanks off more of the throttling ports and makes them ineffectual so that the utilisable port cross-section from the inner chamber 27 into the chamber 30 becomes ever smaller. In approximately the same way, the speed with which the impact absorber is compressed, and consequently the volumetric flow of the pressurized medium, is gradually reduced. One thus achieves a stroke-dependent damping action in which the desired constant damping force is achieved and in which the vehicle itself is slowed down gently and smoothly. The impact absorber is so designed that the theoretical energy absorption is at its optimum at a particular predetermined impact velocity. Preferably however the impact absorber also works with substantially the same degree of efficiency even at higher impact velocities. It is also of course desirable to reduce the impact as far as possible even with the higher impact velocities. With a lower impact velocity than that for which the impact absorber is designed the impact absorber functions completely softly so that for example minor collisions in parking areas are acceptable and not damaging.

FIG. 1c shows the rolling bag 13 inflated as a result of a complete inward telescoping stroke, the bag having a maximum external diameter G which is not exceeded because of the fabric insert 31. The elasticity of the rolling bag ensures that the impact absorber is returned again to its initial position after the dissipation of the energy of impact. The spring characteristic of the rolling bag which, in dependence on the compression stroke, is initially slow, and then becomes more rapid, until it increases to a limiting value determined by the maximum extension of the fabric insert, can be varied within certain limits by the excess pressure of the damping liquid so that the restoring or expansion force created by the restorative resilience of the rolling bag can be varied. However, since the sliding surfaces of the tubes in the region where they overlap one another are well lubricated by the damping liquid, the restoring force only needs to be small. An adverse effect on the sliding properties due to dirt or corrosion is not possible since the sliding surfaces are hermetically sealed against the ambient atmosphere by the resilient bag. Similarly, the danger of leakage of the hydraulic system is not present. The rolling bag simultaneously ensures that there is no need for regular maintenance.

The embodiment of impact absorber shown in FIG. 2 differs from that shown in FIG. 1 in that it incorporates a different form of liquid porting and a different form of control of the port areas. Thus, in the embodiment shown in FIG. 2, a control rod 34 is arranged coaxially with respect to the tubes 11' and 12' and is displaceable through a control plate 37 which separates the internal chambers 35 and 36 of the tubes 11' and 12' from one another. The control rod 34 is connected to the outer tube 12' by the end plate 14 and moves axially in accordance with the movement of the latter. The otherwise cylindrical control rod 34 has a flattened surface area 39 shaped so that the rod 34 and a guide ring 38 within the control plate 37 together define a port having a cross-section which is dependent upon the axial position of the control rod 34. A cross-piece 40 is secured at the end of the control rod 34 within the internal chamber 35 of the inner tube 11'. The cross-piece 40 abuts against the control plate 37 in the rest position of the impact absorber and in conjunction with the control rod 34 prevents any tensile loading on the resilient bag 13. The control plate 37 is secured within the right-hand end of the inner tube 11' as viewed in FIG. 2. It comprises two support rings 41 and 42 which are held apart by a spacer ring 43 and which are rigidly secured between a shoulder 44 and the inturned end 45 of the inner tube 11'. The guide ring 38 floats in the intermediate space between the support rings 41, 42 defined by the spacer ring 43. The guide ring 38 has a degree of play in the radial direction relative to the spacer ring 43 so that it can be radially displaced in accordance with the slight movements of the control rod 34. The guide ring 38 has a radial shoulder 46 and a sealing ring 47 is held between the shoulder 46 and the support ring 41. The radial shoulder 46 is positioned in front of the sealing ring 47 as viewed in the direction of compressive movement of the inner tube 11', so that axial forces transmitted by the control rod 34 to the guide ring 38 improve the sealing of the internal chamber 36 from the internal chamber 35 in the region of the annular gap between the guide ring 38 and the spacer ring 43. Upon inward telescoping movement of the two tubes the hydraulic liquid expelled from the internal chamber 36 thus passes only through the port area formed between the control rod 34 and the guide ring 38 and into the internal chamber 35, from where it flows through overflow ports 48 into the chamber 30 surrounding the bag 13 with practically no damping.

Instead of using a solid control rod 34 provided with a flat surface area one can alternatively use for example a control tube provided with ports which are sealed off by the control plate upon compression of the impact absorber.

So that the telescopic tubes 11' and 12' do not need to be calibrated to an accurate degree, but rather so that tubes with greater tolerances than usual may be used, a clearance 49 is provided between the two tubes. So that this clearance 49 does not lead to any degradation of the damping characteristic, which should desirably be the same for all impact absorbers of a particular type, a sealing ring 51 is provided in an annular groove 50 in the external surface of the inner tube 11', this sealing ring 51 preventing any damping liquid being expelled from the chamber 36 through the gap 49 upon compression of the two tubes in the event of an impact and thus preventing degradation of the damping characteristic which is determined by the flat surface area 39. In FIG. 2b this zone of the inner tube is shown on an enlarged scale. The width of the groove 50 is somewhat larger than the diameter of the sealing ring 51, and the base 52 of the groove slopes radially inwardly towards the inturned end 45 of the inner tube 11'. This means that the sealing ring 51, upon inward compressive movement, presses strongly against the internal surface of the outer tube 12', while upon outward expansive movement the frictional forces are kept small in order to have as little influence as possible on the re-storing force. The time which the impact absorber takes to return to its rest position is small, so that subsequent shocks occurring after an initial impact in a collision are damped in the same way and with the same high degree of efficiency.

Both embodiments of impact absorber are able to hold the bumper or fender of a vehicle, to operate noiselessly, and to absorb lateral forces which arise from angled or one-sided impacts on the bumper. This is achieved by making the length F of the mutual guide surfaces of the tubes of the impact absorber as shown in FIG. 2 equal to or greater than the diameter of the sliding surfaces. Due to the overlap of the tubes the lateral rigidity of the impact absorber, and particularly its resistance to cracking, is increased. It is possible for example without any further modification to raise a vehicle by means of a crane hook hooked under the impact absorber. In order to keep the volumetric capacity of the two tubes small, the maximum possible stroke length H is chosen to be smaller than the diameter of the sliding surfaces.

The maximum possible stroke length H can be chosen in accordance with a predetermined high impact velocity, while the resilient bag on the other hand only needs to be designed to take up the volume of liquid expelled from the tubes upon a partial stroke. If the tubes are compressed together beyond this partial stroke then the bag bursts while the damping action remains unimpaired. This design of impact absorber has its advantage for the case where the impact absorber and a crumpling zone of the vehicle chassis are connected in series, so that the impact absorber can absorb by delayed actions the energy which cannot be taken up by the crumpling zone of the chassis which may for example only be designed for forces of up to 30g. After traversing the normal or partial stroke the damping characteristic may be modified as required, for example by an extension of the flat surface area of the control rod or by a change in the cross-section of the throttling ports.

Because of its proportions the impact absorber is substantially insensitive to overloading. The loading limit of the impact absorber of FIG. 1 is first reached when the inner tube expands to bind against the inside of the outer tube. However, this is not to be expected since the outer tube itself also expands to a certain degree and the clearance provided between the two tubes must first be taken up by any such radial expansion of the inner tube. The impact absorber is rendered functionally useless in the event of an excessive shock only after the bursting of one of the tubes. This applies also to the embodiment shown in FIG. 2 in which the outer tube must burst since no pressure can build up in the internal chamber of the inner tube to deform this tube.

We claim:

1. A hydraulic impact absorber comprising two telescopically movable tubes containing damping liquid, a resilient bag encircling and secured to said tubes, said bag being arranged to receive damping liquid expelled from the tubes through throttling port means upon compression of the tubes and at the end of a compression stroke being able to restore itself resiliently, wherein the length of the sliding and mutually guiding overlapping surfaces of the two tubes in the rest position of the impact absorber is at least as great as the diameter of the said surfaces, wherein said diameter is less than the maximum stroke length, and wherein the resilient bag is formed as a tubular rolling bag with reinforcing means.

2. An impact absorber as claimed in claim 1, in which the damping liquid is held permanently under a pressure greater than atmospheric pressure by the resilient bag.

3. An impact absorber as claimed in claim 1, in which the resilient bag has a resilient internal layer on the inside of its reinforcing means, and on the outside of its reinforcing means has a dirt-resistant, and preferably ozone-resistant, resilient external layer.

4. An impact absorber as claimed in claim 1 in which the external diameter of the resilient bag is limited by said reinforcing means with the tubes telescoped together.

5. An impact absorber as claimed in claim 1 in which the resilient bag has its ends rigidly secured to the respective tubes by fastening rings.

6. An impact absorber as claimed in claim 1, in which the resilient bag is formed as an end stop limiting the outward relative movement of the tubes.

7. An impact absorber as claimed in claim 1, in which the throttling port means comprises a plurality of ports provided through one of said tubes, said throttling ports being arranged to be sealed off sequentially by the other tube upon inward telescoping movement of the tubes, wherein at the outer end of said one tube provided with said throttling ports there is provided a flange ring encircling and radially spaced from said one tube and overlapping at least certain of the throttling ports adjacent to the tube outer end, and wherein said flange ring has the resilient bag mounted thereon.

8. An impact absorber as claimed in claim 7, in which the throttling ports are shaped to be of increasing cross-section radially outwardly of the tube axis.

9. An impact absorber as claimed in claim 7, in which the outer tube includes a rigid stop which is arranged to engage against the inner tube with the parts of the impact absorber in their rest positions.

10. An impact absorber as claimed in claim 9, in which said rigid stop comprises a cross-piece positioned within the internal chamber of the inner tube and carried by an axial rod, the cross-piece being arranged to abut against a stop ring secured in the inner tube when the parts of the impact absorber are in their rest positions.

11. An impact absorber as claimed in claim 10, in which the cross-piece is of rectangular cross-section viewed in the direction of compression and is positioned offset through 90° relative to a correspondingly shaped aperture in the stop ring.

12. An impact absorber as claimed in claim 1, in which the throttling port means is formed by a control rod carried by the outer tube, determining the flow cross-section. and displaceable into a bore through a control plate dividing the internal chambers of the tubes from one another, and wherein the internal chamber of the inner tube is connected to the chamber enclosed by the resilient bag by overflow port means.

13. An impact absorber as claimed in claim 12, in which said control rod is basically cylindrical with a flat surface area in which the annular groove for the sealing ring has a bottom surface which slopes radially inwardly towards the inner end of the inner tube.

14. An impact absorber as claimed in claim 12, in which the outer tube includes a rigid stop which is arranged to engage against the inner tube with the parts of the impact absorber in their rest positions.

15. An impact absorber as claimed in claim 14, in which the rigid stop comprises a cross-piece positioned within the internal chamber of the inner tube and carried by said control rod, the cross-piece being arranged to abut against said control plate when the parts of the impact decreasing in flow cross-section with increasing compression stroke.

16. An impact absorber as claimed in claim 12, in which the control rod is floatingly guided within the control plate.

17. An impact absorber as claimed in claim 16, in which the control plate comprises a guide ring which is only movable radially, and in which a sealing ring is provided axially between a radial shoulder of the guide ring and the inner tube or a support ring secured thereto.

18. An impact absorber as claimed in claim 17, in which said radial shoulder is positioned between the sealing ring and the inner end of the inner tube.

19. An impact absorber as claimed in claim 17, in which the control plate includes two support rings held spaced apart and connected rigidly to the inner tube, said support rings holding the guide ring therebetween for radial displacement.

20. An impact absorber as claimed in claim 19, in which the control plate is rigidly held in the inner end of the inner tube by pressing the tube on to the control plate and thereby reducing the external diameter of the tube in the region of the control plate.

21. An impact absorber as claimed in claim 1, in which the two tubes fit inside one another with clearance therebetween and a sealing ring is provided in an annular groove in the external surface of the inner tube.

22. An impact absorber as claimed in claim 21, absorber are in their rest positions.

23. An impact absorber as claimed in claim 1, in which a filler hole for the damping liquid is provided in a zone of the outer tube not encircled by the resilient bag.

24. An impact absorber as claimed in claim 1, in which the damping liquid is an oil with a flat viscosity curve.

25. An impact absorber as claimed in claim 1, having a maximum stroke length corresponding to a particular predetermined impact velocity, but wherein the resilient bag can only receive damping liquid expelled from the tubes in an amount corresponding to only a partial stroke.

26. An impact absorber as claimed in claim 1, in which the maximum stroke length does not exceed the length of said sliding surfaces of the tubes.

* * * * *

UNITED STATES PATENT OFFICE
CERTIFICATE OF CORRECTION

Patent No. 3,774,895          Dated November 27, 1973

Inventor(s) Jean Herbert Willich, Johannes J. DeBaan and Erich Hahn

It is certified that error appears in the above-identified patent and that said Letters Patent are hereby corrected as shown below:

col. 1, line 41   "utlized" should be --utilized-- line 57   "Wth" should be --With-- col. 2, line 24   "suffiiently" should be --sufficiently-- col. 3, line 25   "leadkage" should be --leakage-- col. 5, line 58   Delete "the" before "longer"

col. 11, line 12   After "claim 1" insert a comma line 16   After "claim 1" insert a comma col. 12, lines 1-3   after "area" delete "in which ... inner tube" and substitute <u>decreasing in flow cross-section with increasing compression stroke</u> col. 12, line 13   after "impact" delete "decreasing in ... compression stroke" and substitute <u>absorber are in their rest positions;</u> line 42   after "claim 21," delete "absorber are ... rest positions" and substitute <u>in which the annular groove for the sealing ring has a bottom surface which slopes radially inwardly towards the inner end of the inner tube</u>

Signed and sealed this 23rd day of April 1974.

(SEAL)
Attest:

EDWARD M.FLETCHER,JR.
Attesting Officer

C. MARSHALL DANN
Commissioner of Patents